United States Patent
Bildner et al.

[11] Patent Number: 5,823,301
[45] Date of Patent: Oct. 20, 1998

[54] BRAKE PADS AND PROCESS FOR THEIR PRODUCTION

[75] Inventors: Karlheinz Bildner, Linsengericht-Grossenhausen; Christoph Freist, Bielefeld, both of Germany

[73] Assignee: CWW-Gerko Akustik GmbH & Co. KG, Frankfurt, Germany

[21] Appl. No.: 763,300

[22] Filed: Dec. 10, 1996

Related U.S. Application Data

[63] Continuation-in-part of Ser. No. 669,695, Jun. 24, 1996, abandoned.

[30]   Foreign Application Priority Data

Jun. 23, 1995 [DE] Germany ............ 195 22 889.8

[51] Int. Cl.⁶ ............................................. F16D 65/38
[52] U.S. Cl. ............................... 188/73.37; 188/264 G
[58] Field of Search ............. 188/73.35, 73.37, 188/251 A, 251 M, 73.1, 264 G; 428/463

[56]           References Cited

U.S. PATENT DOCUMENTS

| 4,042,085 | 8/1977 | Bjerk et al. ............... 188/251 A X |
| 4,098,951 | 7/1978 | Wolff ............................ 188/73.35 X |
| 4,373,615 | 2/1983 | Melinat ...................... 188/73.37 X |
| 5,099,962 | 3/1992 | Fufusu et al. ............... 188/73.37 |

FOREIGN PATENT DOCUMENTS

| 0 604 090 | 6/1994 | European Pat. Off. . |
| 0 619 354 | 10/1994 | European Pat. Off. . |
| 2 273 980 | 1/1976 | France . |
| 22 03 417 | 8/1973 | Germany . |
| 25 13 131 | 9/1975 | Germany . |
| 27 13 377 | 9/1977 | Germany . |
| 28 40 343 | 4/1979 | Germany . |
| 28 21 194 | 11/1979 | Germany . |
| 34 02 866 | 9/1984 | Germany . |
| 87 10 924.7 | 11/1987 | Germany . |
| 2 020 763 | 11/1979 | United Kingdom . |

OTHER PUBLICATIONS

Verein Deutscher Ingenieure Guidelines 2229, Jun. 1979.
Patents Abstracts of Japan, vol. 6, No. 216, Oct. 29, 1982.
Patents Abstracts of Japan, vol. 15, No. 211, May 29, 1991.

*Primary Examiner*—Peter M. Poon
*Attorney, Agent, or Firm*—Evenson, McKeown, Edwards & Lenahan P.L.L.C.

[57]           ABSTRACT

A brake pad has a support made of two metal sheets bonded together by a damping layer. The damping layer is formed exclusively from a crosslinked plastic adhesive in a thickness of about 75 μm to 100 μm, and is either a peroxide-crosslinked polyacrylate or a peroxide-crosslinked silicone adhesive.

10 Claims, 1 Drawing Sheet

BRAKE PADS AND PROCESS FOR THEIR PRODUCTION

CROSS-REFERENCE TO RELATED APPLICATION

This application is a continuation-in-part of co-pending application serial No. 08/669,695, filed Jun. 24, 1996 now abandoned.

BACKGROUND AND SUMMARY OF THE INVENTION

This invention relates to a brake pad which has a support plate consisting of two metal sheets bonded together by a damping layer and in which the one metal sheet is provided with a friction facing. The invention furthermore relates to two methods for the production of such a brake pad.

A brake pad of the kind described above is the subject matter of DE-C-28 21 194. According to this patent, the damping layer consists of a non-increasable material. A cyclized rubber with a thickness of 150 µm is an example of this, or a rubber-modified asbestos with a thickness of 0.5 mm. Also, synthetic latex or a rubber-modified epoxy resin sheet are said to be suitable as a damping layer according to the patent. For the production of a brake pad one metal sheet is provided on one side and the other metal sheet is provided on both sides with an adhesive. Then the first metal sheet is placed in a press mold and the damping layer is laid on its adhesive layer. Then the second metal sheet is placed on the damping layer and friction facing composition is filled in. In the pressing that follows, the friction facing composition is bonded to one metal sheet and the metal sheets are bonded to one another by the damping layer.

Since in the pressing procedure the damping layer must not be allowed to flow toward the sides by the necessary pressure and the heat, the choice of materials for the damping layer is very limited. In practice it has been found that the brake pads according to the aforementioned German patent 28 21 194 also tend to squeal when the brakes are applied, since the damping action is not entirely satisfactory. It is obvious, of course, to make the damping layer thicker to improve the damping properties. This, however, is not possible in practice, because it then flows off to the side of the metal sheet while it is being pressed in the mold.

SUMMARY OF THE INVENTION

It is a primary object of the present invention to provide a brake pad of the kind described above such that it will have the best possible damping effect, yet can be made at reasonable cost.

It is a further object of the present invention to provide methods for the manufacture of such a brake shoe.

The first mentioned problem is solved according to the invention in that the damping layer consists exclusively of a highly crosslinked synthetic adhesive at a thickness of about 20 µm to about 200 µm, preferably about 75 µm to about 100 µm.

Surprisingly such a brake pad, in spite of its thinner damping layer, has a substantially better damping action than the known brake pad, and also better than common brake pads in which a thin metal damping sheet is laid between the metal sheet and the piston applied to it, which produces the braking force. The manufacture of the brake shoe according to the invention is very simple, because the highly crosslinked adhesive needs only to be applied to one metal sheet, and it is no longer necessary to apply cement to both metal sheets with the damping material between them. Since the damping layer of the brake pad according to the invention can be substantially thinner than the one according to DE-C-28 21 194, there is less danger of having it flow away when the friction facing is applied.

In addition to this, the damping layer can be produced at lower cost since it requires less material due to the lesser thickness. Furthermore, the thin damping layer can better transmit the shearing forces produced by braking, so that the supporting plates do not shift away from one another to such an extent that interlocking indentations provided in them have to transmit shearing forces, resulting in squealing.

Especially great damping values result, with a peak at temperatures of about 30° C. if the damping layer is a peroxide-crosslinked polyacrylate in a layer about 75 µm thick.

Good damping values, which are not quite so high, but extend over a greater temperature range than in the case of polyacrylate, are obtained which peak at temperatures of about 50° C. in continuous use, if according to another embodiment of the invention, the damping layer is a peroxide-crosslinked silicone adhesive of a thickness of approximately 100 µm.

The second object, namely the creation of a process for manufacturing a brake pad which has a support consisting of at least two metal sheets bonded together by a damping layer between them, and in which a friction facing is applied in a press mold to an adhesive layer on one of the metal sheets, can be achieved according to the invention by applying a highly crosslinked adhesive to only one metal sheet in a first step, and then completing the support by pressing a second metal sheet onto the adhesive; this support is then provided in a press with the friction facing on one metal sheet.

This process can be performed very inexpensively, since the adhesive needs only to be applied to one metal sheet and no longer to both metal sheets followed by the damping composition. By the method according to the invention a brake pad is created which has an especially high damping action and therefore does not have any tendency to squeal. By combining the two metal sheets with the damping material in a single procedure independent of the application of the friction facing, it is possible to select the optimum pressure for the purpose regardless of the pressure that is correct for the application of the friction facing.

Another method according to the invention comprises applying only a highly crosslinked adhesive to a metal sheet as the damping layer in a first step, and then pressing a second metal sheet onto the adhesive, and thereafter punching out the metal sheets bonded to one another by the adhesive, and then putting the friction facing on a metal sheet in a press.

Such a method makes it possible first to produce a sandwich of large metal sheets out of which the individual supports are then punched. Then, in a second procedure, which can even be performed in another factory, the friction facing is pressed onto the support.

Particularly high damping results when a peroxide-crosslinked polyacrylate is used as the adhesive for bonding the metal sheets.

It is best if the polyacrylate is applied to the metal in a thickness of about 75 µm.

As an alternative to polyacrylate, it is possible according to another embodiment of the process to use a peroxide-crosslinked silicone cement as the adhesive for bonding the metal sheets. This cement has its maximum damping at about 50° C.

Optimum damping is obtained in the case of silicone adhesives at about 100 μm.

BRIEF DESCRIPTION OF THE DRAWING

Other objects, advantages and applications of this invention will be made apparent by the following detailed description. The description makes reference to a preferred and illustrative embodiment of the invention presented in the accompanying drawings wherein.

DESCRIPTION OF THE PREFERRED EMBODIMENTS

Figure 1:
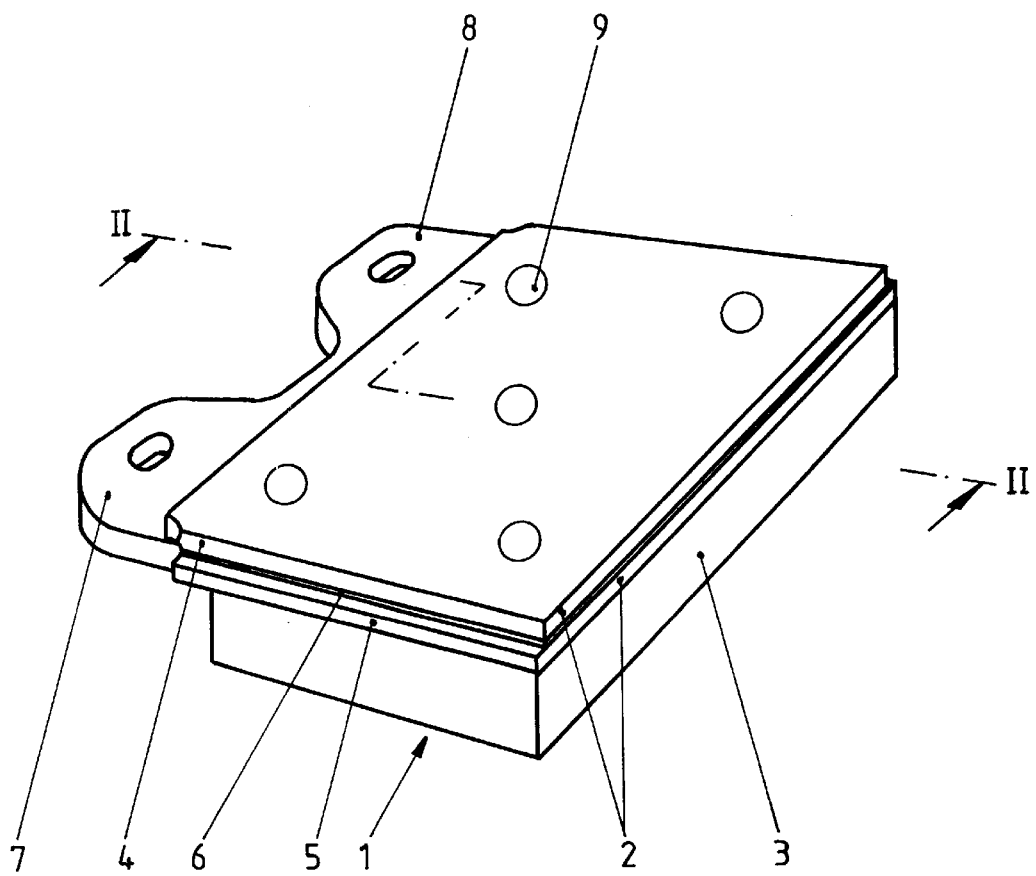
FIG. 1 is a perspective view of a brake pad according to the invention.

FIG. 1 shows a brake pad 1 as a whole, in which in the usual manner a support 2 bears the brake lining 3. The support 2 consists of two metal sheets 4 and 5 which are bonded together by a thin damping layer 6. As customary in brake pads, the brake pad 1 according to the invention has on one side two lugs 7 and 8 which serve for fastening the brake pad 1 in a brake housing not shown.

Figure 2:
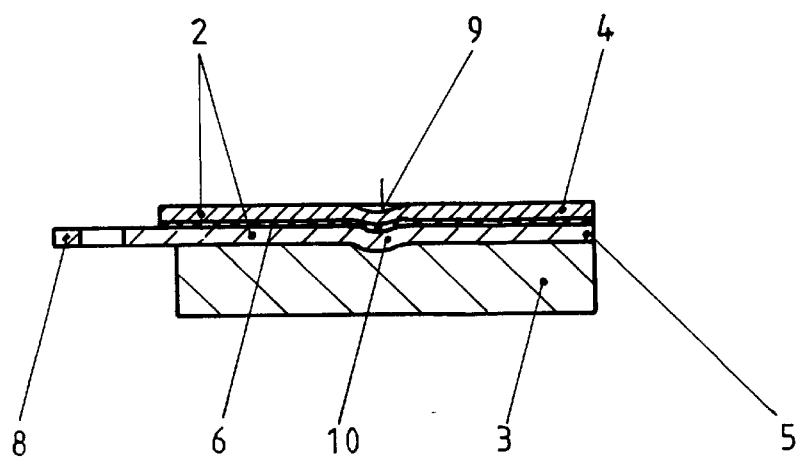
FIG. 2 is a cross-section through the brake pad along the line II—II of FIG. 1.

In the upper metal sheet 4 seen in FIG. 1, several indentations 9 are present. FIG. 2 shows that these indentations reach into matching indentations 10 in the lower metal sheet 5, and thus secure the metal sheets 4 and 5 against shifting on one another. The indentations 9 in this embodiment have a spheroidal shape. They could, however, be of different shape, such as trapezoidal or rectangular. It is important only that they relieve the damping layer 6 from shear forces.

The nature of the damping layer 6 is important to the invention. It is either a peroxide-crosslinked polyacrylate of a thickness of about 75 μm or a peroxide-crosslinked silicone adhesive with a thickness of about 100 μm. A preferred polyacrylate adhesive contains about 80% to about 95% of an acrylic acid ester copolymer of a type which is well-known in the art (e.g., Synthacryl VSC 2291 manufactured by Hoechst AG), 0% to about 1.5% of a conventional stabilizer (e.g., Irganox 1010 manufactured by Ciba Geigy), 0% to about 20% of an alkyl-phenol resin (Alresin PA 103 manufactured by Hoechst AG), and 0% to about 10% modified resin compounds (Additol VXT 1083 manufactured by Hoechst AG), all amounts being by weight. A preferred silicone adhesive contains about 20% to about 60% of a conventional polysiloxane (PSA 6574 made by General Electric Silicones), 0% to about 2% of an organic peroxide, and about 40% to about 80% of a suitable aromatic solvent, all amounts being by weight. Up to about 1% by weight of peroxide initiator is used. Mixing may be by kneading or by agitation. The adhesive is cured at a temperature of about 150° to about 200° C. for up to about 60 minutes. The brake lining is bonded with a conventional nitrile rubber phenol resin adhesive (PMBP-50-PSI made by Peroxid-Chemie).

To produce the brake pad 1, sheet metal is unwound from a coil and the composition forming the damping layer 6 is applied with a hand spreader, for example. Then a strip from another coil is laid upon the first piece and the two pieces are pressed together with the damping layer, so that a sandwich is formed from the two plates and the damping layer 6. Then a fairly large number of supports 2 are punched from this sandwich and afterward the friction facing forming the brake lining is pressed onto one side in a mold.

In the most preferred procedure for making the brake pad, the adhesive (Synthacryl VSC 2291 by Hoechst AG) is applied to one metal sheet. After this, the adhesive is dried for a period of 2 minutes so that all the solvent escapes. The temperature of the adhesive during this drying period is 90° C. After being dried, the temperature of the adhesive is increased up to 180° C. and is kept constant at 180° C. for 15 minutes for cross-linking. Thereafter, the second metal sheet is applied.

It should be apparent from the foregoing detailed description that the objects set forth at the outset to the specification have been successfully achieved. Moreover, while there is shown and described present preferred embodiments of the invention, it is to be distinctly understood that the invention is not limited thereto but may be otherwise variously embodied and practiced within the scope of the following claims.

What is claimed is:

1. A brake pads comprising:

(A) a support which comprises two metal sheets bonded together by a damping layer, and (B) a friction facing provided on one of said metal sheets, wherein said damping layer is a peroxide-crosslinked polyacrylate adhesive of a thickness of about 75 μm or a peroxide-crosslinked silicone adhesive of a thickness of about 100 μm.

2. A brake pad according to claim 1, wherein the damping layer is a peroxide-crosslinked polyacrylate of a thickness of about 75 μm.

3. Brake pad according to claim 1, wherein the damping layer is a peroxide-crosslinked silicone adhesive of a thickness of about 100 μm.

4. A method for the manufacture of a brake pad which has (A) a support which comprises at least two metal sheets bonded together by a damping layer between them, and (B) a friction facing pressed onto an adhesive layer on one of said metal sheets in a mold, said method comprising:

applying a peroxide-crosslinked polyacrylate adhesive of a thickness of about 75 μm or a peroxide-crosslinked silicone adhesive of a thickness of about 100 μm as a damping layer to one metal sheet and then pressing a second metal sheet onto the adhesive to thereby form said support.

5. A method according to claim 4, wherein the adhesive for bonding the metal sheets is a peroxide-crosslinked polyacrylate adhesive, and wherein said polyacrylate is applied to the metal sheet with a thickness of about 75 μm.

6. A method according to claim 4, wherein the adhesive for bonding the metal sheets is a peroxide-crosslinked silicone adhesive, and wherein said silicone is applied to the metal sheet with a thickness of about 100 μm.

7. A method according to claim 6, wherein the silicone adhesive is applied to the metal plate in a thickness of approximately 100 μm.

8. A method for the manufacture of a brake pad, which has (A) a support which comprises at least two metal sheets bonded together with the insertion of a damping layer between them, and (B) a friction facing on one metal sheet, said method comprising:

applying a peroxide-crosslinked polyacrylate adhesive of a thickness of about 75 µm or a peroxide-crosslinked silicone adhesive of a thickness of about 100 µm to one metal sheet as the damping layer, pressing a second metal sheet onto the adhesive, punching out individual supports from the metal sheets bonded together, and providing the support with the friction facing on one metal sheet.

9. A method according to claim 8, wherein the adhesive for bonding the metal sheets is a peroxide-crosslinked polyacrylate adhesive, and wherein said polyacrylate is applied to the metal sheet with a thickness of about 75 µm.

10. A method according to claim 8, wherein the adhesive for bonding the metal sheets is a peroxide-crosslinked silicone adhesive, and wherein said silicone is applied to the metal sheet with a thickness of about 100 µm.

* * * * *